US012441517B2

(12) United States Patent
Jasinski, Jr. et al.

(10) Patent No.: US 12,441,517 B2
(45) Date of Patent: Oct. 14, 2025

(54) CONTAINER APPARATUS AND METHOD (71) Applicant: The Government of the United States of America, as represented by the Secretary of Homeland Security, Washington, DC (US)

(72) Inventors: John F. Jasinski, Jr., Hammonton, NJ (US); Lee J. Spanier, Linwood, NJ (US)

(73) Assignee: The Government of the United States of America, represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/654,225

(22) Filed: May 3, 2024

(65) Prior Publication Data

US 2024/0367859 A1    Nov. 7, 2024

Related U.S. Application Data

(60) Provisional application No. 63/464,016, filed on May 4, 2023.

(51) Int. Cl.
*B65D 25/20*        (2006.01)
(52) U.S. Cl.
CPC ................... *B65D 25/20* (2013.01)

(58) Field of Classification Search
CPC ............. G01N 2001/185; G01N 23/10; G01N 33/48778; B65G 2201/0258; B65D 25/20
See application file for complete search history.

(56) References Cited

U.S. PATENT DOCUMENTS

| 4,491,234 A | * | 1/1985 | Wilcock | B44D 3/121 |
| | | | | 401/121 |
| 2005/0025686 A1 | * | 2/2005 | Sargent | A61L 2/18 |
| | | | | 422/301 |
| 2012/0160638 A1 | * | 6/2012 | Baker | B64F 1/368 |
| | | | | 198/523 |

* cited by examiner

*Primary Examiner* — Andrew T Kirsch
(74) *Attorney, Agent, or Firm* — Kelly G. Hyndman; Robert W. Busby (57) ABSTRACT

In an example, a bin prowl apparatus comprises a bin prowl including a distal end and a proximal end. The proximal end has a proximal width which is at least ten times larger than a distal width of the distal end. The proximal end is configured to be connected with a front wall of a bin. The proximal width of the proximal end is at least 30% of a bin width of the front wall of the bin. The distal end extends forward from the proximal end along a direction of a length of the bin and is spaced from the proximal end by a minimum distance of 10% to over 100% of the proximal width of the proximal end.

26 Claims, 14 Drawing Sheets

| Bin with Prowl | Bin with Weight (Front) | Bin with Weight (Middle) | Bin with Weight (Rear) |
|---|---|---|---|
| 0g | 235g | 475g | 1960g |

| Samsung Galaxy | iPhone | Belt | Hat | Sweatshirt | $4 in Quarters |
|---|---|---|---|---|---|
| 175g | 250g | 180g | 95g | 370g | 90g |

CONTAINER APPARATUS AND METHOD

CROSS-REFERENCE TO RELATED APPLICATIONS

The application is a nonprovisional of and claims the benefit of priority from U.S. Provisional Patent Application No. 63/464,016, filed on May 4, 2023, entitled CONTAINER APPARATUS AND METHOD, the disclosure of which is incorporated by reference in its entirety.

SUMMARY STATEMENT OF GOVERNMENT INTEREST

The present invention was made with support from the United States Department of Homeland Security (DHS) and by an employee of DHS in the performance of their official duties. The U.S. Government has certain rights in this invention.

FIELD

The discussion below relates generally to screening objects and, more particularly, to apparatuses and methods for improving the screening process of objects placed in bins moving through a screening machine.

BACKGROUND

A primary goal of TSA (Transportation Security Administration) for airport checkpoint security is to detect prohibited items carried by passengers while ensuring the screening process is as quick and nonintrusive as possible. Issues at the checkpoint can lead to backed up lines and frustrated customers. One of the situations giving rise to a decrease in screening throughput is where low-weight bins going through the screening scanners get stuck on the lead curtain strips at the entrance and/or the exit of the scanners or scanning machine such as X-ray lead curtain strips for X-ray scanning machines. The stuck bins between the entrance curtain strips and the exit curtain strips require an agent to pause the scanner conveyor, use a pole to push out the stuck bins, and utilize a different security technology to screen those light-weight items.

In one example, passengers waiting in line to go through an AIT (Advanced Imaging Technology) Body Scanner realize they are still in possession of items that should have been placed on the conveyor into the scanning machine. These items must now be placed into a bin and sent through the detection system. The forgotten items typically do not weigh enough to produce sufficient momentum for the bin to penetrate the curtain strips. While the bin can be manually pushed through the entrance curtain strips at the entrance of the scanning machine, it is very difficult, if not impossible, to manually reach the bin, when it is stuck against the exit curtain strips at the exit of the scanning machine, to manually get the bin through the exit curtain strips. In some cases, because the items are stuck behind the exit curtain strips, the passengers do not see them and leave the screening area without retrieving them, leading to further complications and frustrations.

SUMMARY

Embodiments of the present invention are directed to improving the screening process of objects placed in a bin or tray or container moving through a screening machine with curtain strips. When only light weight items are placed in the bin, one may attach a removable or detachable bin prowl to the front of such a low-weight bin. The bin prowl reduces the weight required on the bin to pass through a screening machine such as an explosive detection system with curtain strips at the entrance and/or exit of the system. The bin prowl is configured to fit a variety of different standard bins (e.g., as approved by TSA). The bin prowl can be detachable or removable so as not to interfere with the ability of putting the standard bins through automated bin returns.

In accordance with an aspect, a bin prowl apparatus comprises a bin prowl having a distal end and a proximal end. The proximal end has a proximal width which is at least ten times larger than a distal width of the distal end. The proximal end is configured to be connected with a front wall of a bin. The proximal width of the proximal end is at least 30% of a bin width of the front wall of the bin. The distal end extends forward from the proximal end along a direction of a length of the bin and is spaced from the proximal end by a minimum distance of 10% to over 100% of the proximal width of the proximal end.

In accordance with another aspect, a bin prowl apparatus comprises a bin prowl having a planar structure with a distal end and a proximal end. The bin prowl has a maximum width as a proximal width at the proximal end and a minimum width as a distal width at the distal end. The proximal width is at least ten times larger than the distal width. The proximal end is configured to be connected with a front wall of a bin. The distal end extends forward from the proximal end along a direction of a length of the bin and is spaced from the proximal end by a minimum distance of 10% of a bin width of the front wall of the bin.

In accordance with yet another aspect, a method of forming a bin with prowl comprises connecting a proximal end of a bin prowl to a front wall of a bin. The bin prowl has a distal end extending forward from the proximal end along a direction of a length of the bin. The proximal end has a proximal width which is at least ten times larger than a distal width of the distal end. The proximal width of the proximal end is at least 30% of a bin width of the front wall of the bin. The distal end is spaced from the proximal end by a minimum distance of 10% to over 100% of the proximal width of the proximal end.

Other features and aspects of various examples and embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

DETAILED DESCRIPTION

A number of examples or embodiments of the present invention are described, and it should be appreciated that the present invention provides many applicable inventive concepts that can be embodied in a variety of ways. The embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure along with the knowledge of one of ordinary skill in the art.

Embodiments of the invention are directed to solving the light-weight bin issue by fitting such bins with bin prowls. A bin prowl acts in a fashion similar to the prowl of a ship or the cowcatcher or cattle pusher of a train. In the instance of a ship, the prowl cuts through the water to minimize the force needed to push a ship along. For the train, the cattle pusher moves any object in front of it off to the side. The bin prowl operates on generally the same principles.

In one example, a bin prowl is a convex shaped part (e.g., a generally triangular shaped part) which extends forward from the front wall of a screening bin. The bin prowl will make contact with the lead curtain strips of the checkpoint scanner first at its distal end or distal tip. The narrow distal end makes contact with a single curtain strip or at most two curtain strips, which requires a substantially smaller force to penetrate than the case where the standard bin makes contact with a large number of curtain strips simultaneously. The bin prowl will then continue to push away the curtain strips to the left and right sides as it moves through the scanner. The convex shaped bin prowl may be a separate part from the standard bin. It is configured to be connected with or to attached to any currently used bin. Additionally, it will not impact the detection performance of the scanner.

Figure 1:
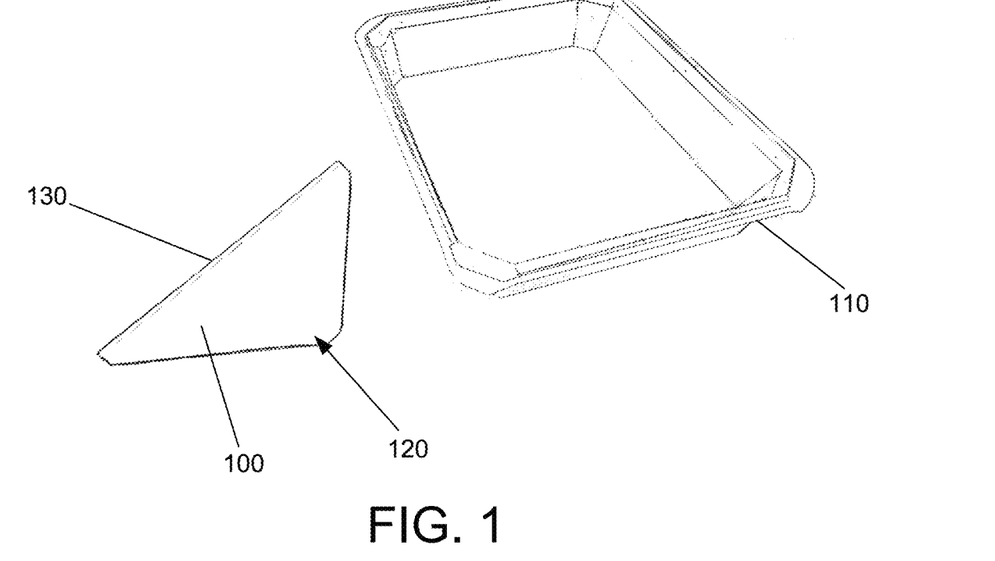
FIG. 1 is a perspective view illustrating a bin prowl to be connected with a bin according to an embodiment.

FIG. 1 is a perspective view illustrating a bin prowl 100 to be connected with a bin or tray or container 110 according to an embodiment. The bin prowl 100 has a narrow distal end 120 and a wide proximal edge or proximal end 130 configured to be connected with a front wall or front panel or leading wall of the bin 110. The bin prowl 100 may have a maximum width as a proximal width at the proximal end 130 and a minimum width as a distal width at the distal end 120. The wide proximal end 130 may be at least about an order of magnitude larger than the narrow distal end 120 (i.e., at least ten times larger in width). The proximal width of the proximal end 130 may be at least 30%, or 50% to 100%, or 80% to 100%, or 95% to 100%, of a bin width of the front wall of the bin 110. The distal end may extend forward from the proximal end along a direction of a length of the bin and be spaced from the proximal end by a minimum distance of 10% to over 100%, or 20 to 80%, or 30% to 70%, of the proximal width of the proximal end. The minimum distance between the proximal end 130 and the distal end 120 may be smaller than the proximal width of the proximal end 130 in some embodiments. In another example, the minimum distance between the proximal end 130 and the distal end 120 may be 10% of the bin width of the front wall of the bin. The bin prowl 100 may have a planar structure or a planar body. The bin prowl 100 may have a triangular shape with an apex 120 that can be rounded. In a different embodiment, the bin prowl 100 may have other convex shapes such as an oval shape or some other curved shape or even a T-shape.

Figure 2:
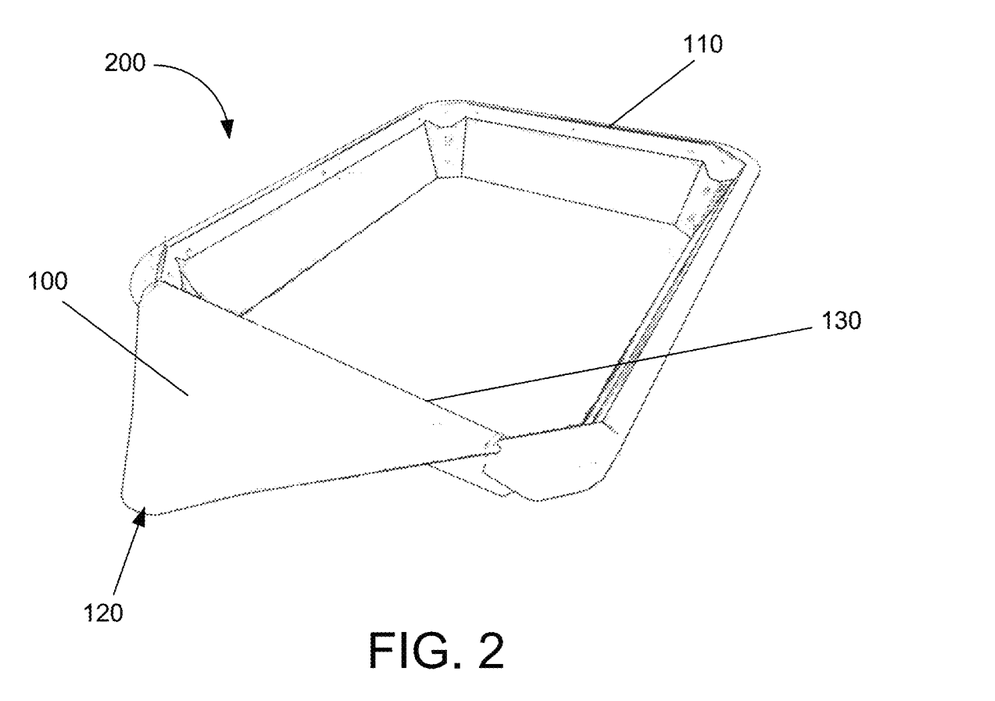
FIG. 2 is a perspective view illustrating the bin prowl connected with the bin of FIG. 1 to form a bin with prowl.

FIG. 2 is a perspective view illustrating the bin prowl 100 connected with the bin 110 of FIG. 1 to form a bin with prowl 200. The proximal end 130 of the bin prowl 100 is connected with the front wall of the bin 110 using any suitable mechanism or means.

Figure 3:
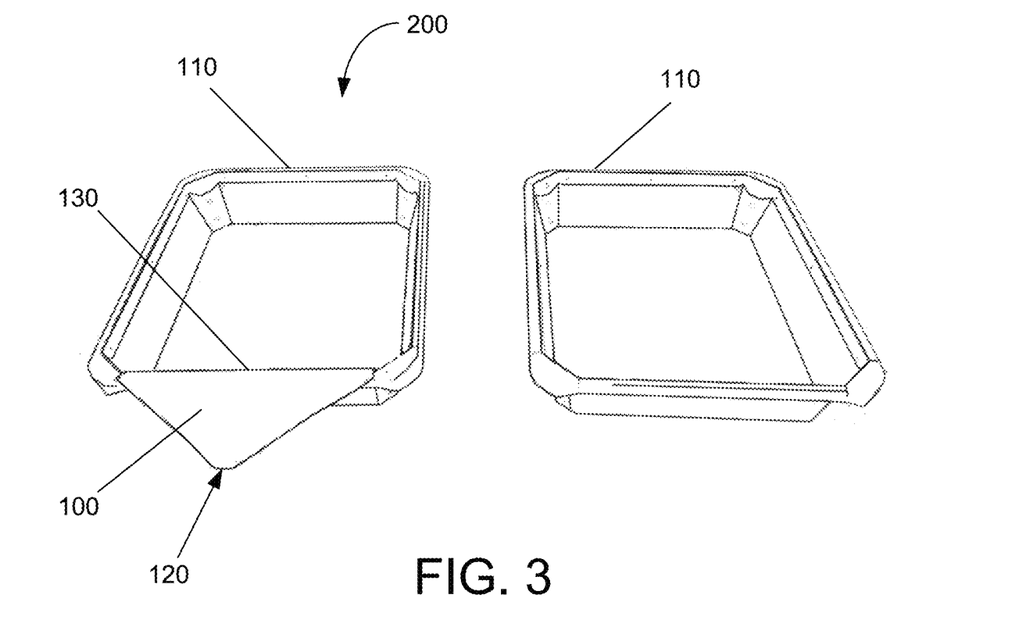
FIG. 3 is a front perspective view of a bin with prowl and a standard bin with no bin prowl.
Figure 4:
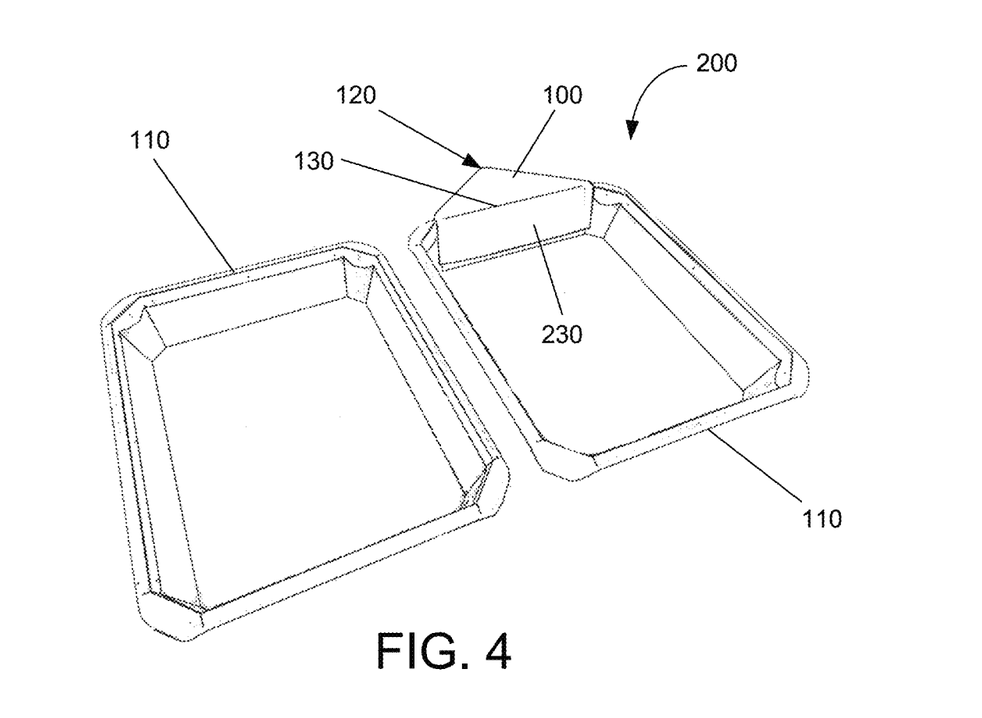
FIG. 4 is a rear perspective view of the bin with prowl and the standard bin of FIG. 3.

FIG. 3 is a front perspective view of a bin with prowl 200 and a standard bin 110 with no bin prowl. FIG. 4 is a rear perspective view of the bin with prowl 200 and the standard bin 110 of FIG. 3. A rear panel or rear member 230 extends from the proximal end 130 downward (e.g., at an approximately right angle relative to the bin prowl 100 or at about 90° angle, +10%) to be connected with or attached to the front wall of the bin 110. The rear panel 230 may extend partially or fully down the height of the front wall of the bin 110. The rear panel 230 may be attached to or connected with the front wall of the bin 110 permanently (e.g., by using adhesives or adhesive tape, or mechanical connectors such as screws, bolts, etc.) or temporarily (e.g., by using Velcro® tape, or clips built into the bin prowl, or by configuring the bin prowl 100 and rear panel 230 in such a way as to form a friction fit or a clip over the upper edge or rim of the front wall of the bin 110). The bin prowl 100 and rear panel 230 may be formed integrally as one unit.

The bin prowl apparatus is made of a material which remains outside of the CT number (Hounsfield Units) threshold for most explosives (low density plastic, plexiglass, etc.). A bin with prowl 200 which is thin and of a low CT value will be much less visible than other items in the X-ray scanner image. The bin prowl apparatuses are tested, as in the case of the standard bins, to ensure they do not negatively interact with any potential threats. The bin prowl apparatuses will meet the same standards for the bins.

Figure 5:
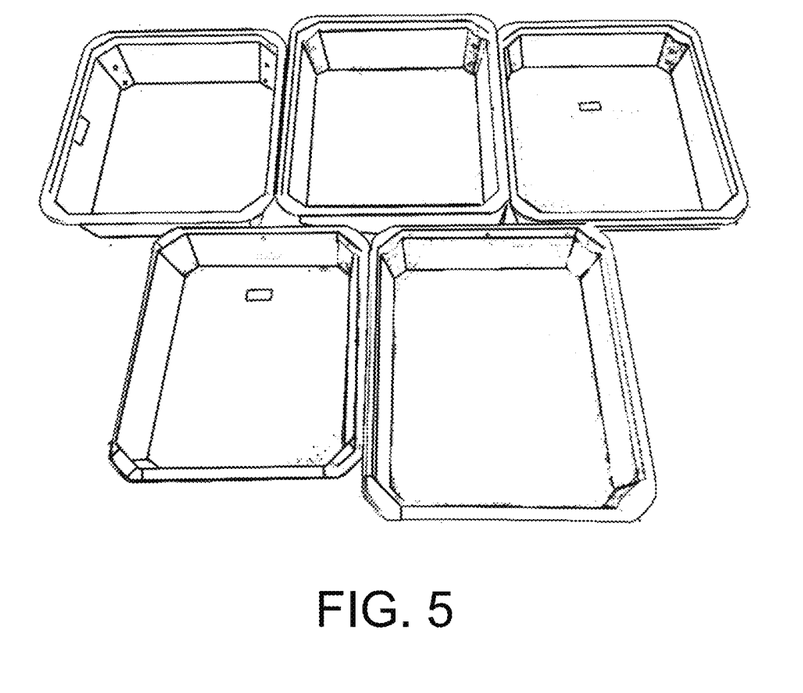
FIG. 5 shows examples of standard bins of different sizes and materials.

FIG. 5 shows examples of standard bins of different sizes and materials. They are made by the same manufacturer.

Automated Screening Lanes at airports are increasingly deployed. Some of them have automated bin return features. Also, the individual airports are allowed to procure any bins they would like, as long as TSA has approved them. There are multiple brands of bins made from different materials in different sizes having different grip tapes and having different rims (top parts or upper edges of the walls of the bin).

Figure 6:
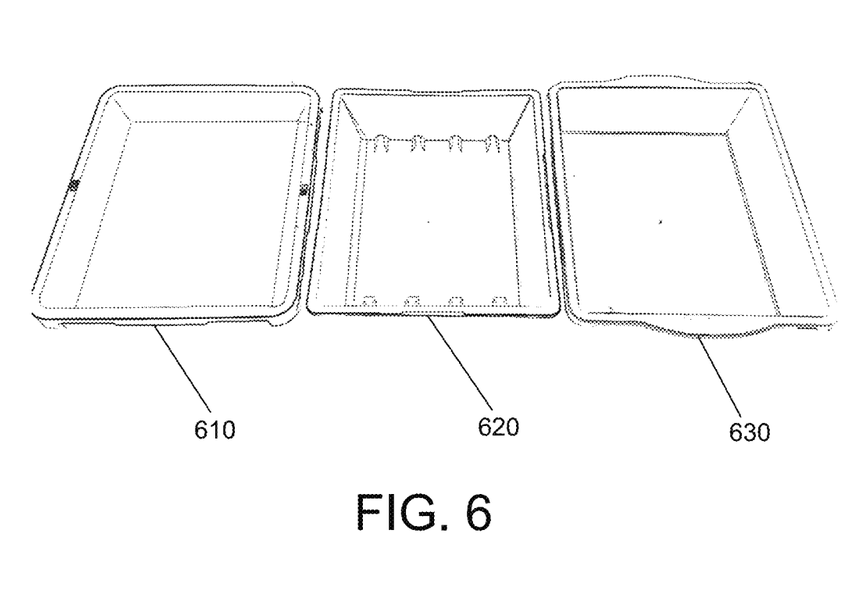
FIG. 6 shows examples of standard bins having different structural features for gripping.

FIG. 6 shows examples of standard bins having different structural features for gripping. There are multiple bin variations made by multiple different companies. A first bin has a straight or uniform lip 610 at the upper edge of the front wall. A second bin has a narrower lip or no lip 620 at the upper edge of the front wall. A third bin has a protruded lip or convex lip 630 at the upper edge of the front wall. The convex lip 630 is significantly smaller in dimension than the bin prowl 100.

In specific embodiments, the bin prowl 100 is intended or configured to be a third party add-on to any bin or tray. For bins with minimal items inside, the user can attach the bin prowl 100 to the front wall of the bin 110 to form the bin with prowl 200 and send the bin with prowl 200 through the scanner for security screening. After screening, the user can remove the bin prowl 100 to change the bin with prowl 200 back to a standard bin 110 and allow for automated bin return.

Figure 7:
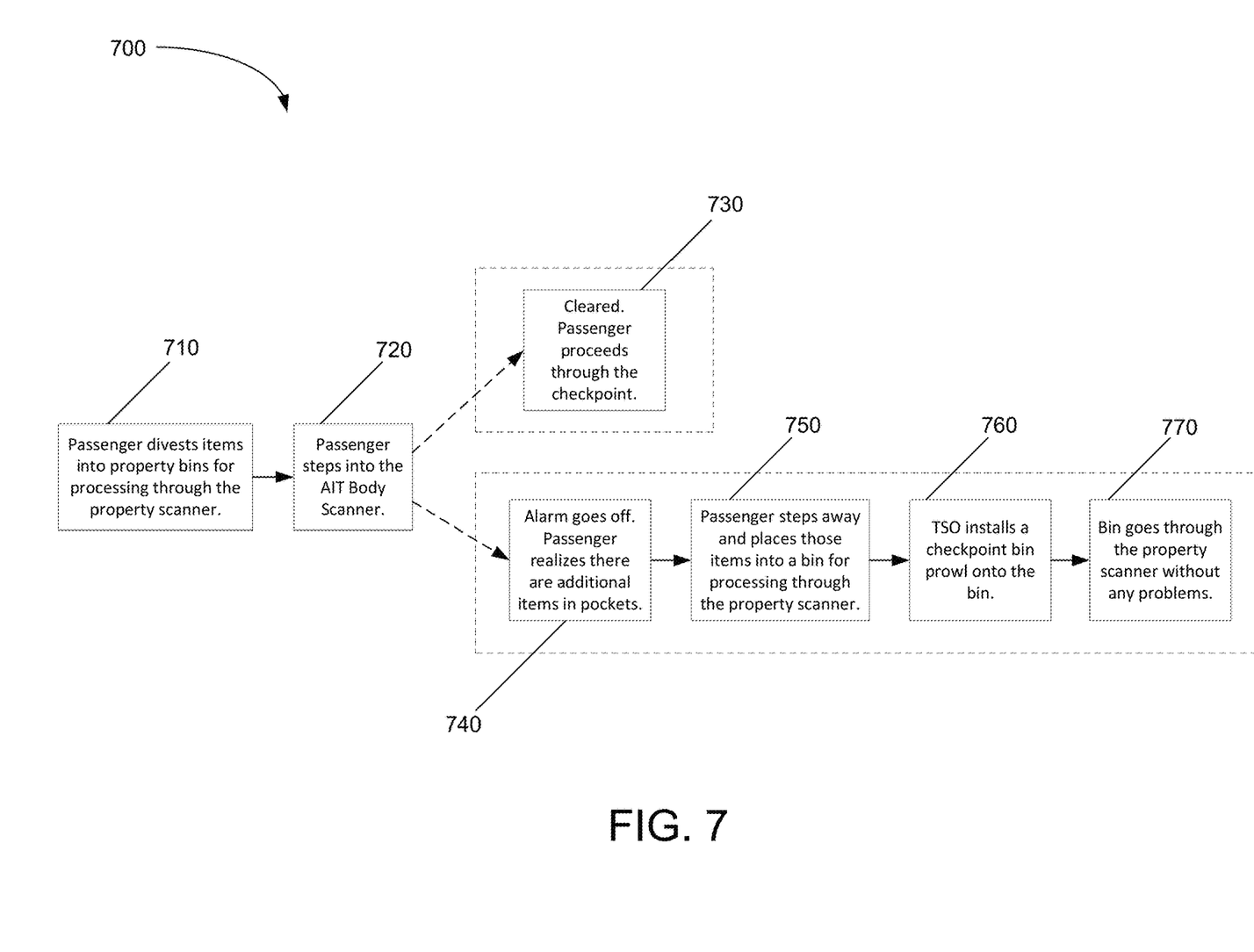
FIG. 7 shows an example of a flow diagram illustrating security screening of items placed in bins to be moved through a scanning machine.

FIG. 7 shows an example of a flow diagram 700 illustrating security screening of items placed in bins to be moved through a scanning machine. In step 710, the traveler or passenger divests or places personal items into one or more bins for screening such as processing through an explosive scanner. In step 720, the passenger steps into an AIT body scanner. If there are no issues, the passenger is cleared and may proceed past the security checkpoint in step 730. Alternatively, the passenger sets off an alarm or realizes that items remain in pockets that should have been placed in the bins in step 740. In step 750, the passenger steps away from the body scanner and places the forgotten items in a bin 110 for processing through the scanner. In step 760, an agent such as a TSO (Transportation Security Officer) installs a bin prowl 100 onto the bin 110 to form a bin with prowl 200. In step 770, the bin with prowl 200 passes through the curtain strips of the scanner without issues regardless of the weight of the item(s) placed therein. Without the bin prowl 100, the standard bin 110 may get stuck at the curtain strips.

Figure 8:
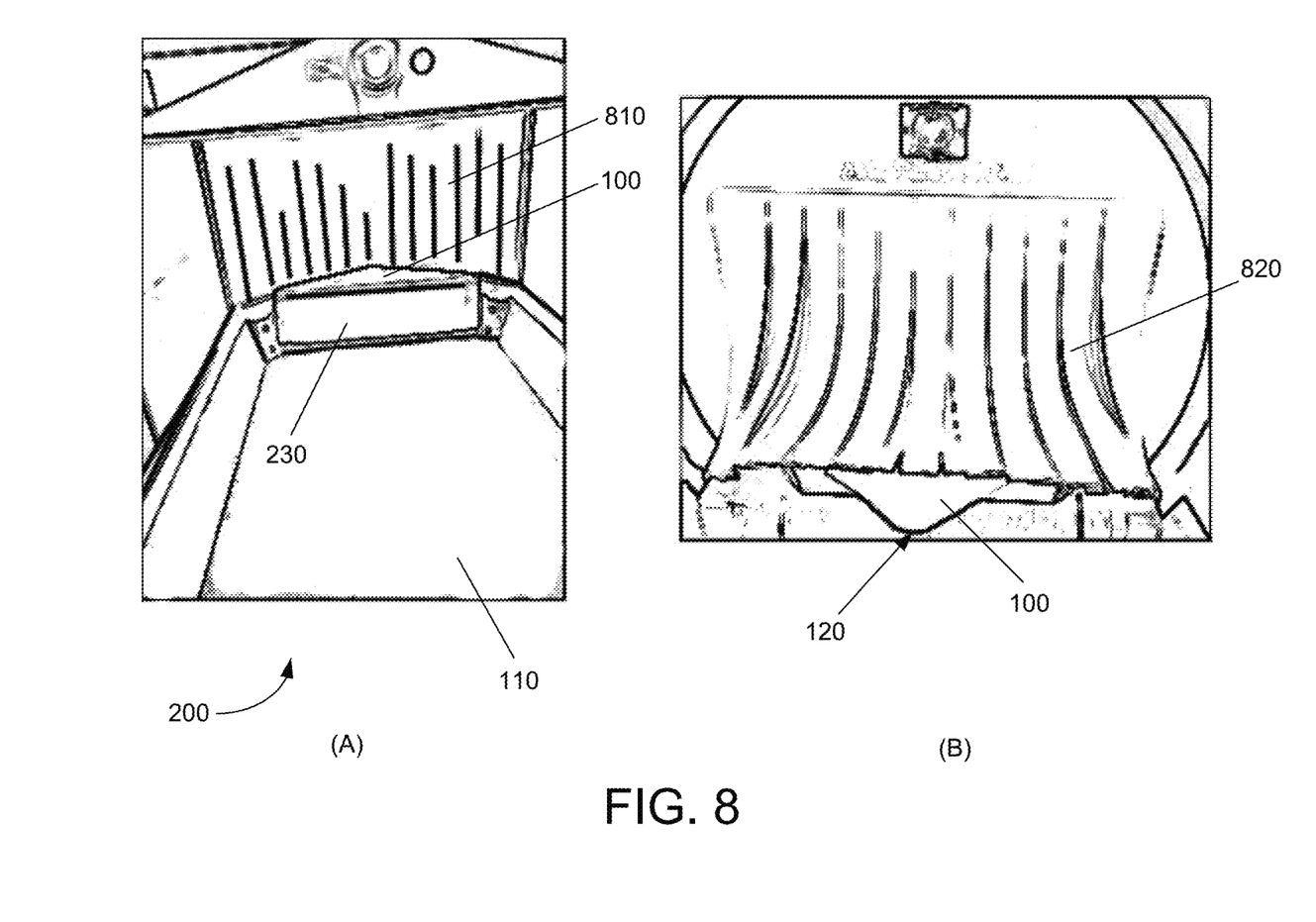
FIG. 8 shows an example of a bin with prowl (A) encountering the entrance curtain strips at an entrance into a scanning machine and (B) exiting the scanning machine through the exit curtain strips at an exit.

FIG. 8 shows an example of a bin with prowl 200, (A) encountering the entrance curtain strips 810 at an entrance into a scanning machine and (B) exiting the scanning machine through the exit curtain strips 820 at an exit.

Figure 9:
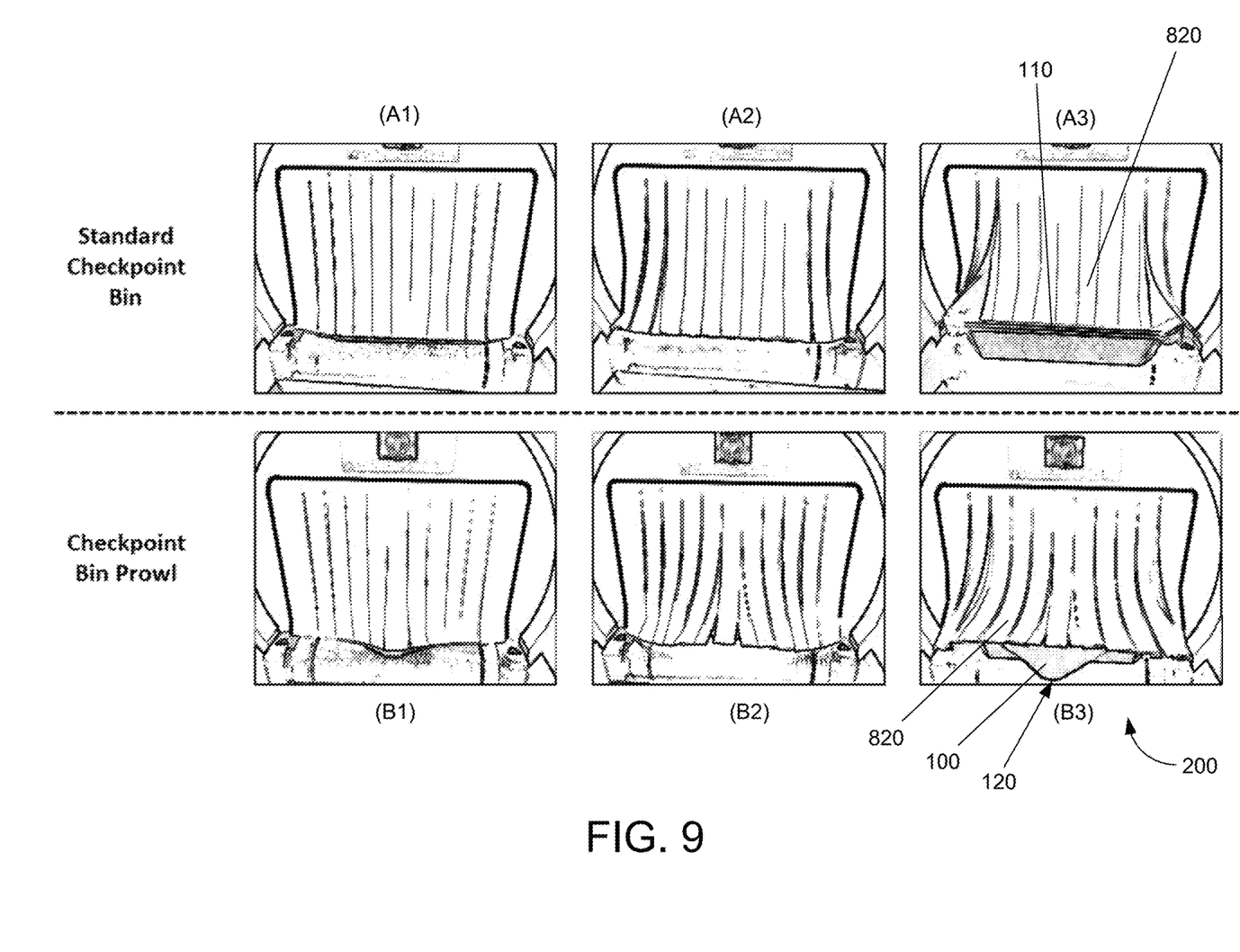
FIG. 9 shows (A1) to (A3) a standard bin exiting through the exit curtain strips and (B1) to (B3) a bin with prowl exiting through the exit curtain strips.

FIG. 9 shows (A1) to (A3) a standard bin 110 exiting through the exit curtain strips 820 and (B1) to (B3) a bin with prowl 200 exiting through the exit curtain strips 820. The narrow distal end 120 of the bin prowl 100 penetrates and parts the curtain strips 810, 820 with ease as opposed to the wide front wall of the standard bin 110. Because the standard bin 110 impacts the curtain strips evenly across the front wall, it is difficult for a lightweight bin to break through the curtain strips. In contrast, the narrow distal end 120 of the bin prowl 100 impacts the curtain strips first and breaks open and spreads the curtain strips. As the rest of the bin with prowl 200 proceeds through the tunnel, the force required to traverse through is reduced.

Figure 10:
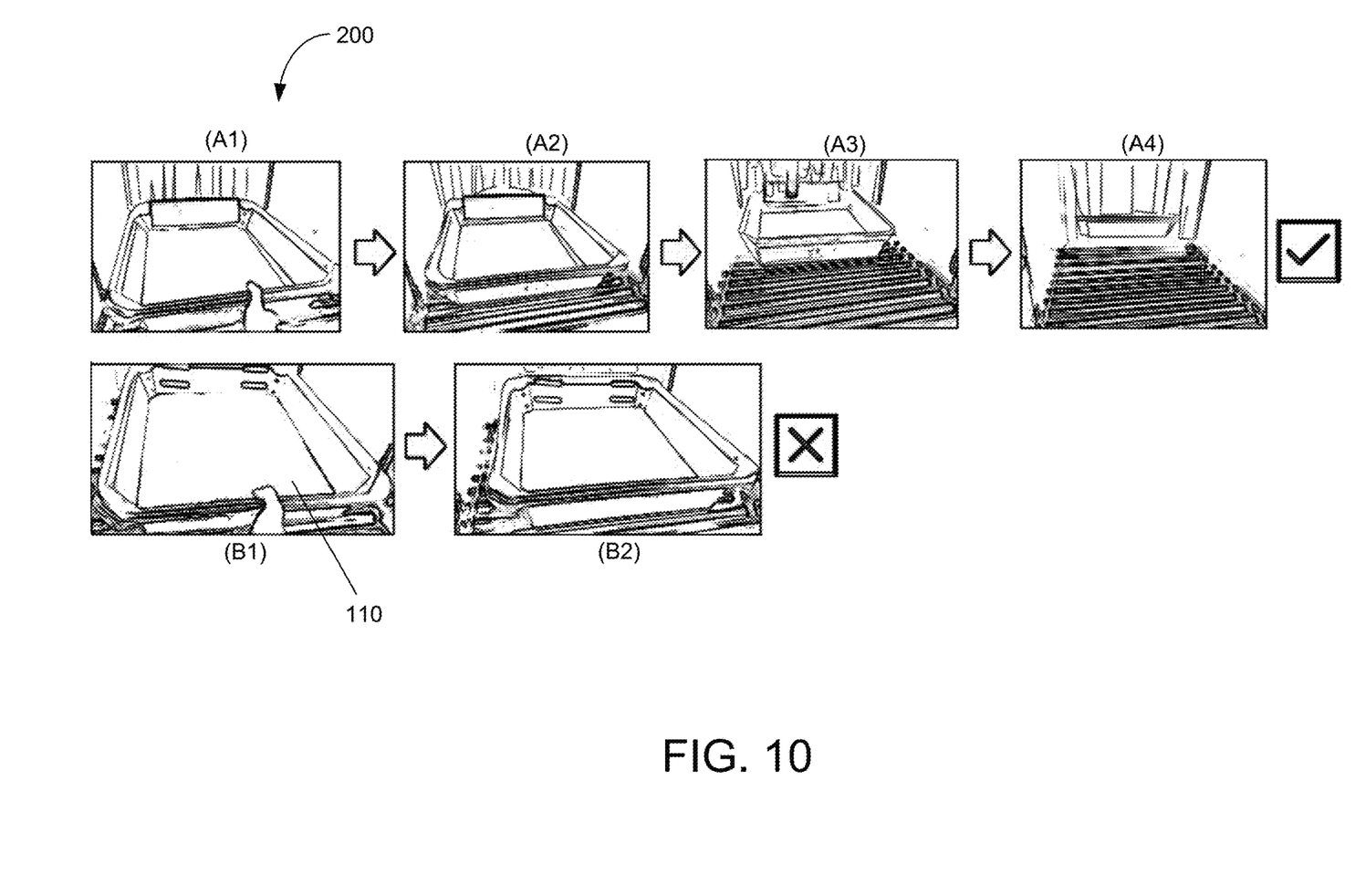
FIG. 10 shows (A1) to (A4) an empty bin with prowl passing through the entrance curtain strips and (B1) to (B2) an empty standard bin getting stuck at the entrance curtain strips.

FIG. 10 shows (A1) to (A4) an empty bin with prowl 200 passing through the entrance curtain strips and (B1) to (B2) an empty standard bin 110 getting stuck at the entrance curtain strips. In the experiment, both the standard bin 110 and the bin with prowl 200 are placed onto the same position of non-powered conveyor and held. The position allows for ~1 inch of the bin to be in contact with the scanners rotating belt. Then the bin is released. The bin attempts to enter the scanner by breaking through the entrance curtain strips, it either succeeds and makes it past the curtain strips or fails and remains in place. The bin with prowl 200 succeeds as seen in views (A1) to (A4). The standard bin 110 fails as seen in views (B1) to (B2).

Figure 11:
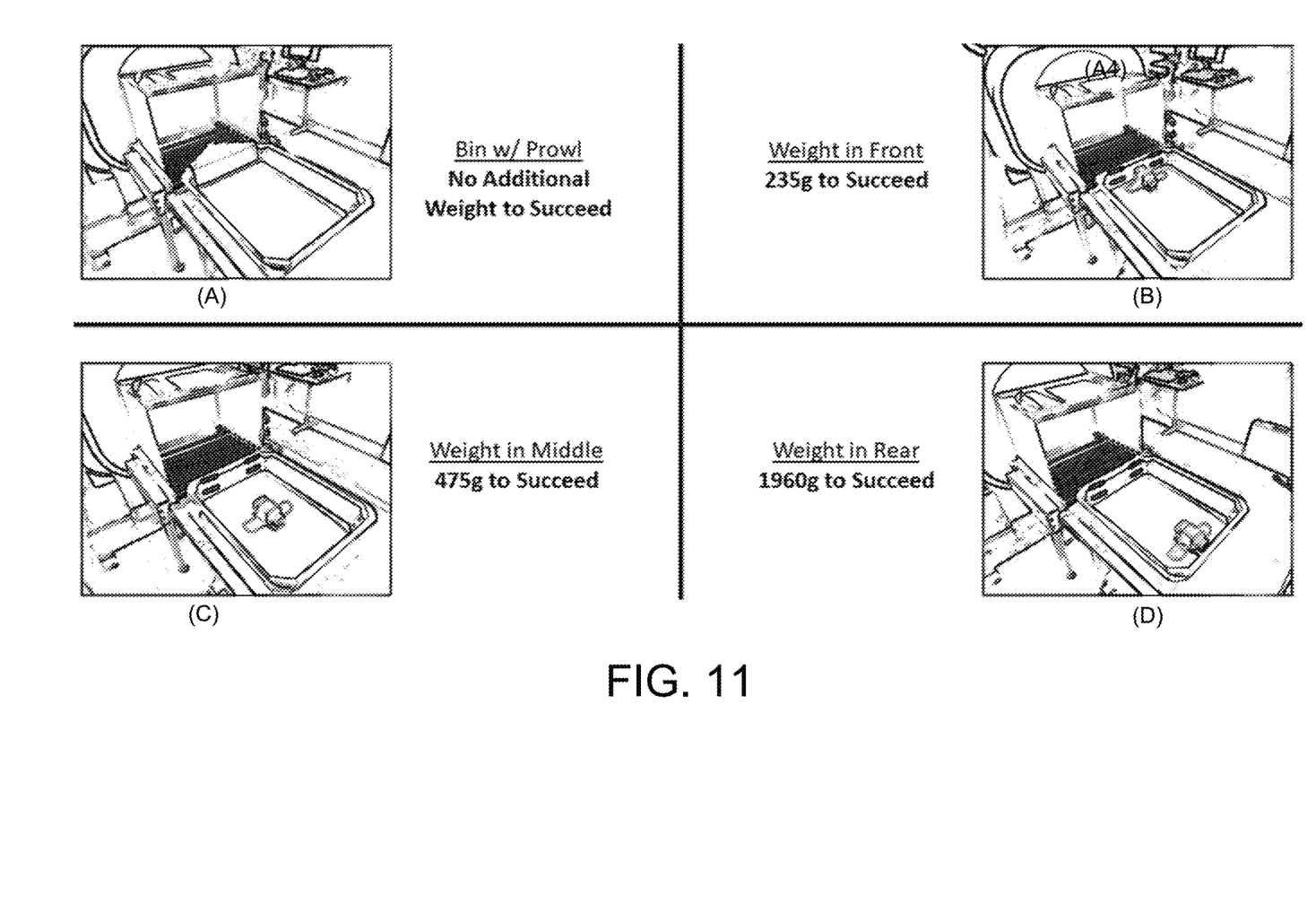
FIG. 11 shows four bins capable of passing through curtain strips of a scanning machine including (A) an empty bin with prowl, (B) a standard bin with a 235 g weight in the front, (C) a standard bin with a 475 g weight in the middle, and (D) a standard bin with a 1960 g weight in the back.

FIG. 11 shows four bins capable of passing through curtain strips of a scanning machine including (A) an empty bin with prowl, (B) a standard bin with a 235 g weight in the front, (C) a standard bin with a 475 g weight in the middle, and (D) a standard bin with a 1960 g weight in the back. These results were obtained by testing conducted on an Accessible Property Screening System (CT) that is TSA certified. The system has non-powered rollers at the front, which lead directly to the powered conveyor belt of the scanner. A bin is held on the non-powered rollers in the same spot each time, allowing about one inch of the bin to be in direct contact with the conveyor belt. The bin is then released to see if it can move past the scanner lead curtain strips and through to the exit.

Figure 12:
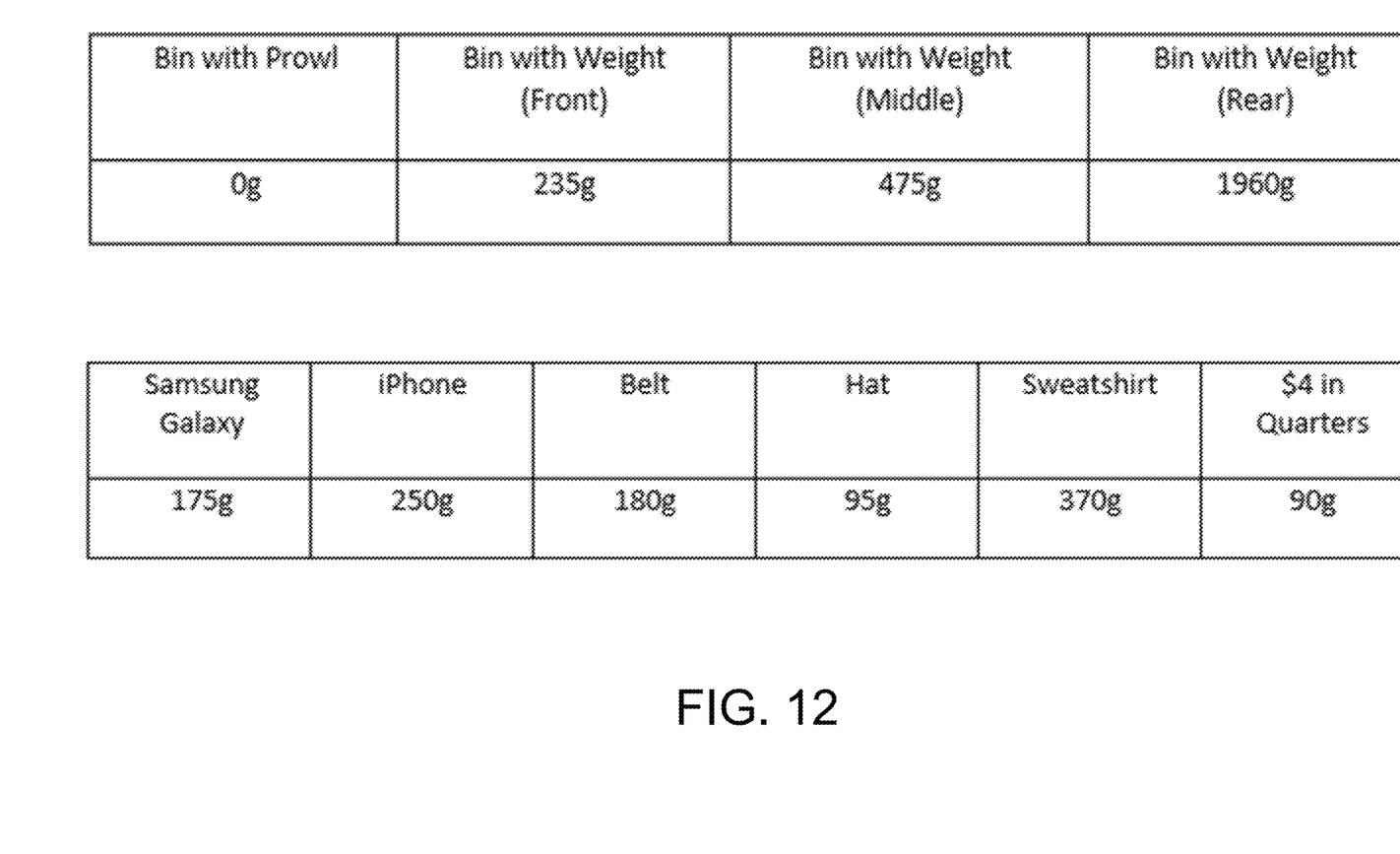
FIG. 12 shows weights of different personal items as compared to weights required in standard bins to pass through curtain strips of a scanning machine.

FIG. 12 shows weights of different personal items as compared to weights required in standard bins to pass through curtain strips of a scanning machine. For example, a Samsung Galaxy weighs 175 g, an iPhone weighs 250 g, a belt weighs 180 g, a hat weighs 85 g, a sweatshirt weighs 370 g, and $4 in quarters weighs 90 g. None of these items by itself adds sufficient weight to a standard bin to generate enough momentum on a conveyor to break through the curtain strips.

Figure 13:
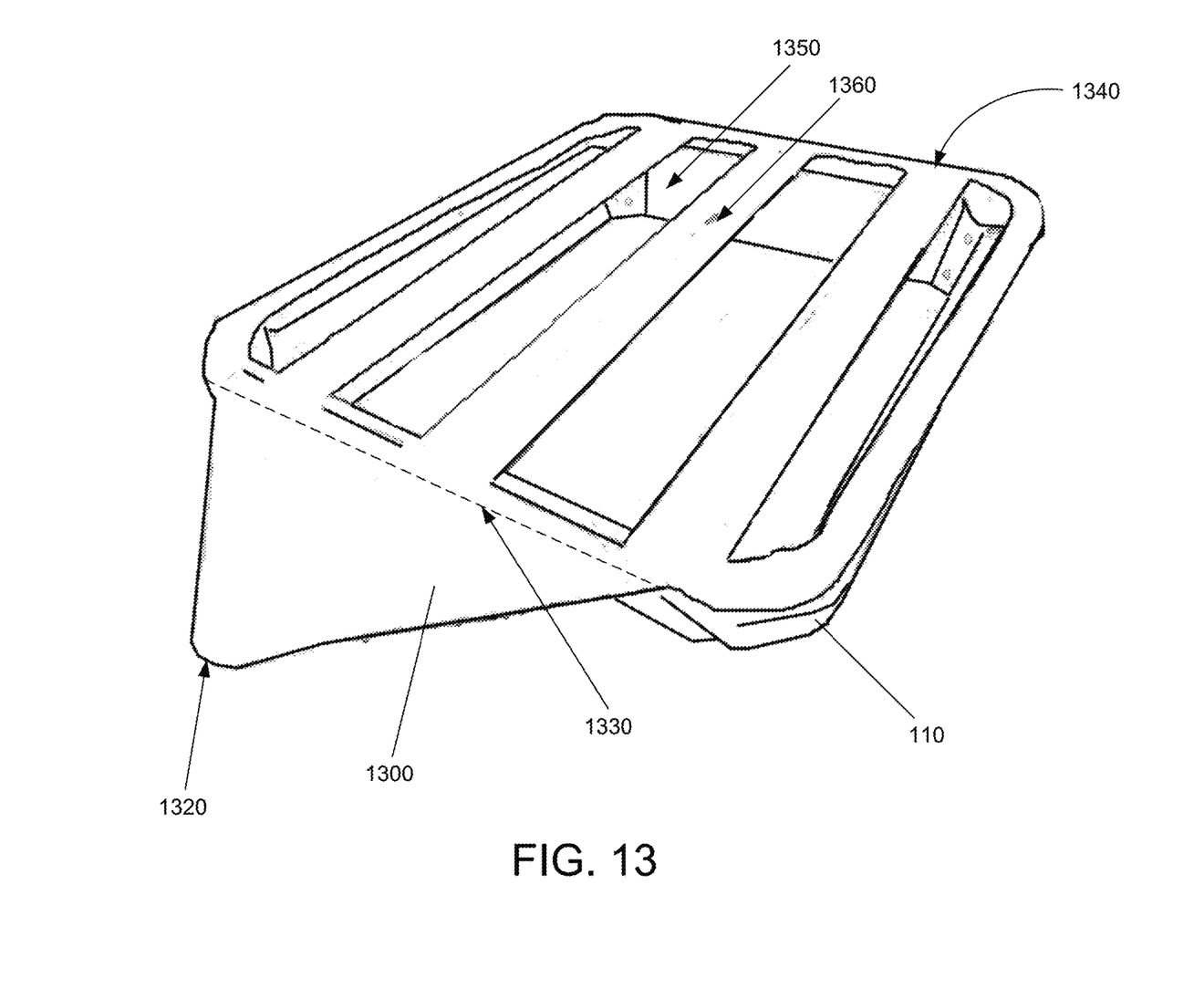
FIG. 13 is a perspective view of a bin prowl and a top panel connected with a bin according to another embodiment.

FIG. 13 is a perspective view of a bin prowl and a top panel connected with a bin according to another embodiment. The bin prowl 1300 has a narrow distal end 1320 and a substantially wider proximal end 1330 which is connected to a top member or top panel 1340. The top panel 1340 extends rearward from the proximal end 1330 to be coplanar with the bin prowl 1300 and to be connected to upper edges of the four walls of the bin 110. The top panel 1340 may be configured as a top lid having side portions extending downward around a periphery of the bin to be connected to and cover the upper edges of the four walls of the bin 110. The top lid 1340 may fit over the bin with a friction fit. The top panel 1340 may have ridges to fit over the upper edges or rims of the bin 110. The top panel 1340 may be solid or may include a plurality of openings 1350, for instance, between the longitudinal strips 1360 as seen in FIG. 13. The openings 1350 may be longitudinal in shape and be about 50%, or 40% to 60%, or 30% to 70%, of the size in area of the top panel 1340. This allows the agents to see and maintain visual contact with the content of the bins. The top panel 1340 may be made at last partially out of plexiglass or some other clear or transparent material. The bin prowl 1300 and top lid 1340 may be formed integrally as one unit such as a single planar member.

The top panel or lid 1340 has the added benefit of preventing the lead curtain strips from dragging over the top of the contents in the bins and possibly moving them off the bins onto the conveyor. In an alternative embodiment, the bin prowl apparatus includes both a rear panel 230 connected to the proximal end 1330 and the top panel 1340 connected to the proximal end 1330 of the bin prowl 1300 as well; the top panel 1340 extends rearward from the rear panel 230 and from the proximal end 1330 of the bin prowl 1300 to be connected to upper edges of walls of the bin 110.

Figure 14:
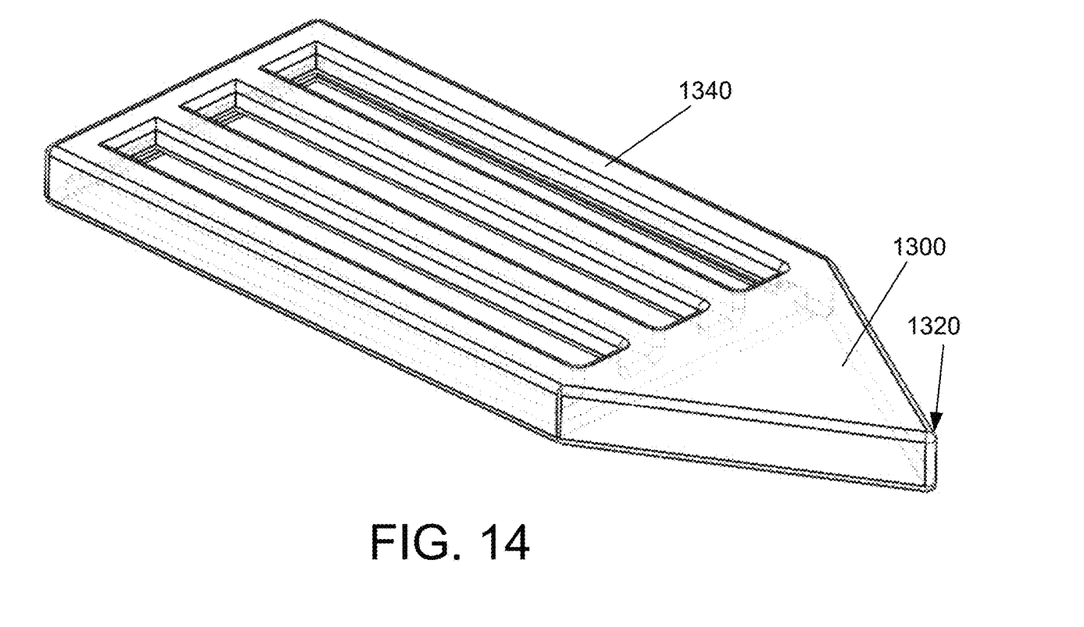
FIG. 14 is an upper perspective view of the bin prowl and top panel of FIG. 13.
Figure 15:
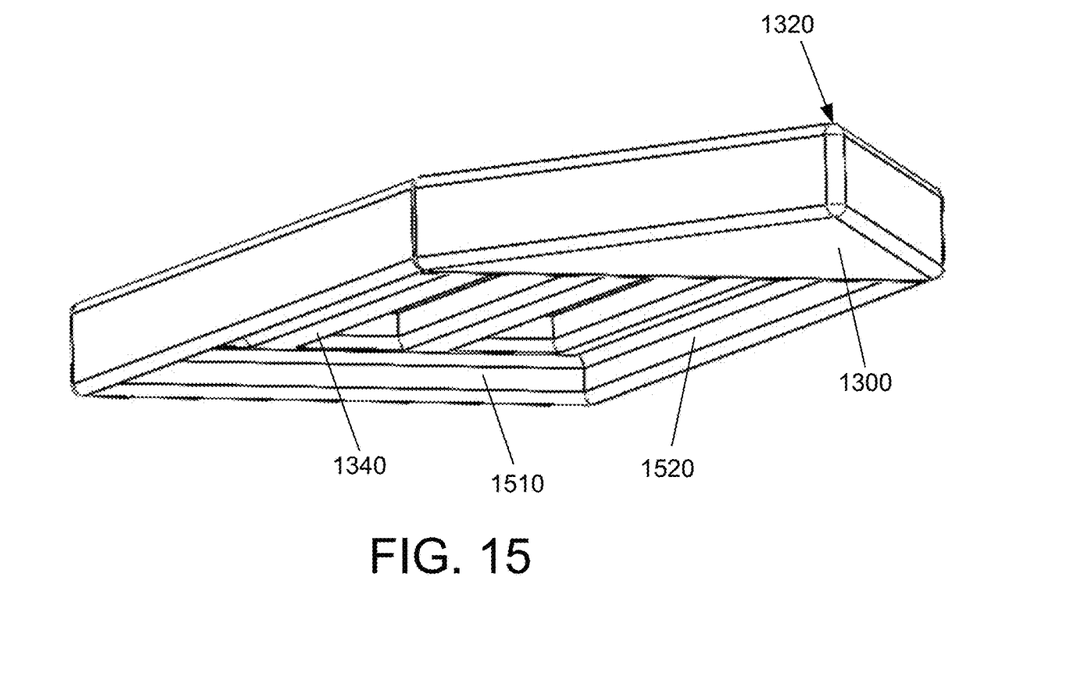
FIG. 15 is a lower perspective view of the bin prowl and top panel of FIG. 13.

FIG. 14 is an upper perspective view of the bin prowl 1300 and top panel 1340 of FIG. 13. FIG. 15 is a lower perspective view of the bin prowl 1300 and top panel 1340 of FIG. 13. The feature of the top lid 1340 is more clearly seen in FIG. 15, in which side portions 1510, 1520 extend downward around the periphery of the top panel 1340 to form the top lid.

There are multiple types of design variance that can be applied to the bin prowl concept. The length of the prowl (end of bin to tip of prowl) can be shortened or lengthened. The shape of the prowl can be altered. For example, it can be designed as a sharp pointed triangle, a more rounded triangle, a curved shape such as oval, or a polygon shape having more than four sides. The thickness of the bin prowl can also be altered. It can be brought down towards the belt for additional grip, or it can be thin as depicted.

Figure 16:
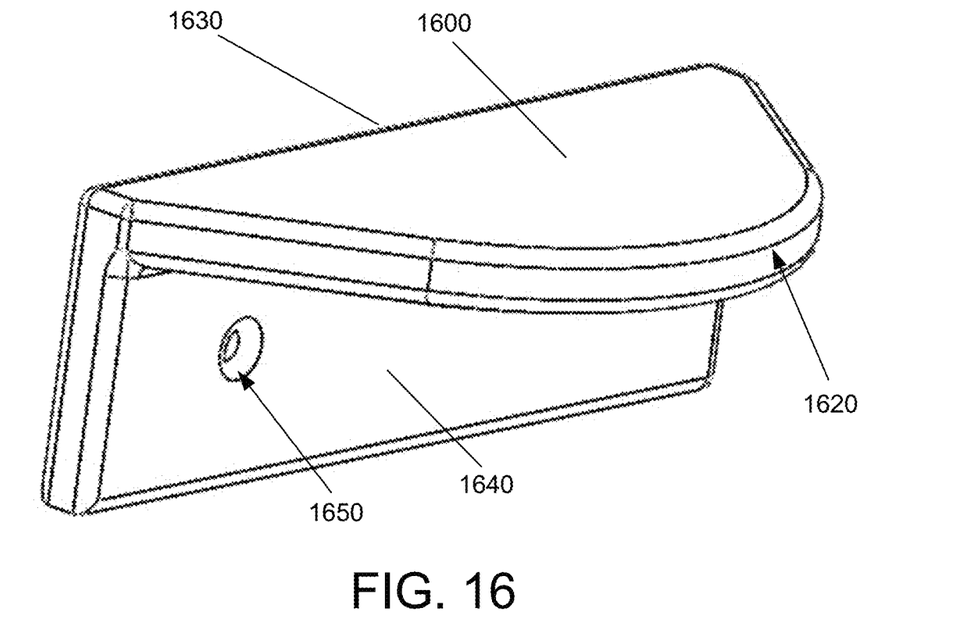
FIG. 16 is a front perspective view of a bin prowl according to another embodiment.
Figure 17:
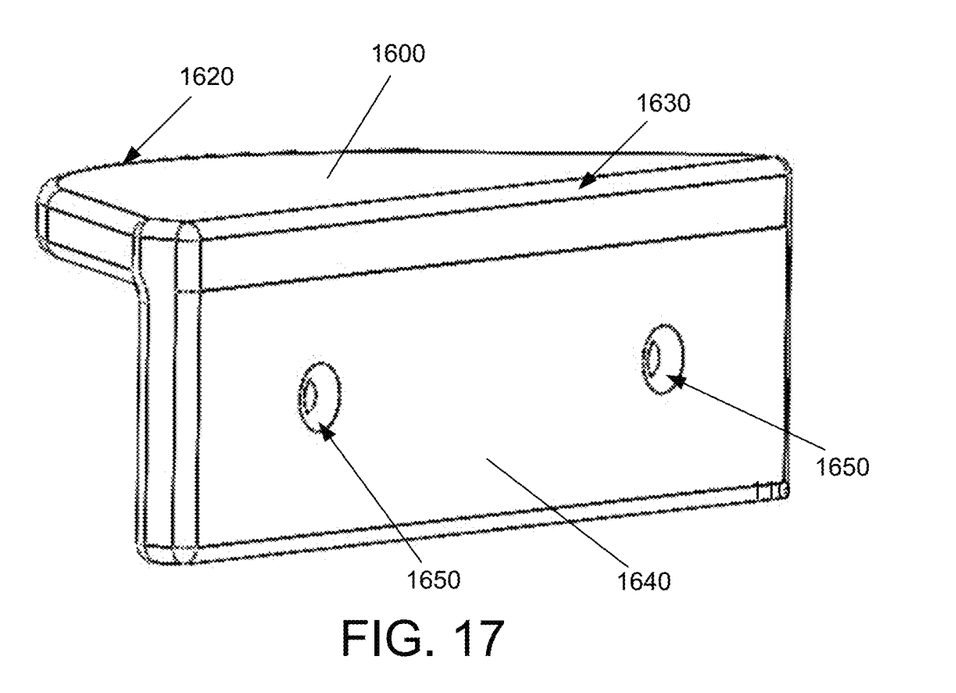
FIG. 17 is a rear perspective view of the bin prowl of FIG. 16.

FIG. 16 is a front perspective view of a bin prowl according to another embodiment. FIG. 17 is a rear perspective view of the bin prowl of FIG. 16. The bin prowl 1600 has a narrow distal end 1620 and a wide proximal end 1630 connected to a rear panel 1640. In this embodiment, the rear panel 1640 includes a plurality of openings or apertures 1650 to receive fasteners or the like for detachably connecting or fastening the rear panel 1640 through the apertures 1650 to the front wall of the bin 110.

The bin prowl can also have different features. One embodiment may have bumps on the top (or bottom). These bumps will act as an additional feature to move curtain strips out of the way of the bin, which will reduce the grip or friction that the bin requires to make it through the scanner curtain strips. The front of the prowl can be swooped backwards as a way to also reduce friction required.

Figure 18:
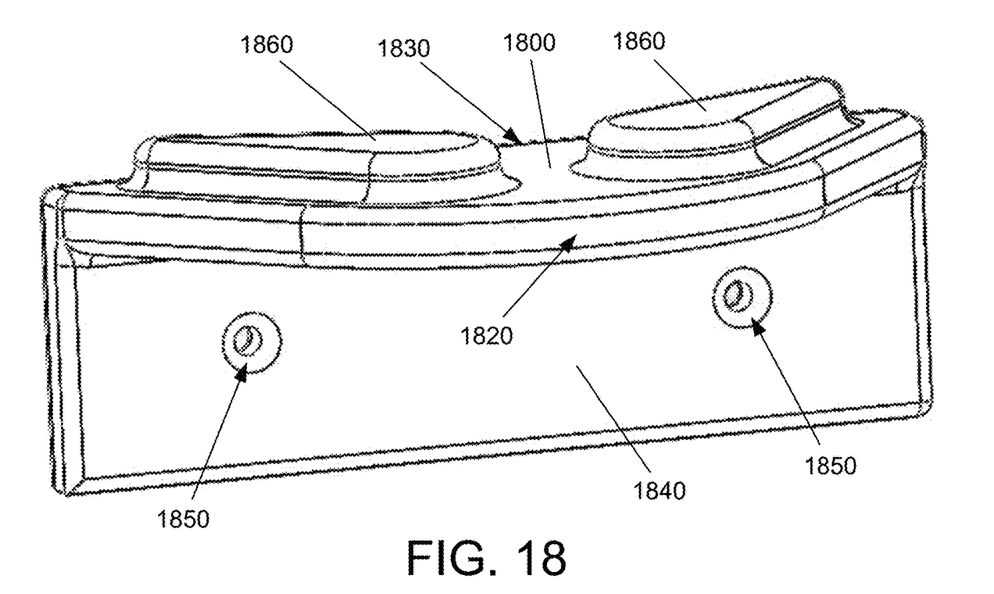
FIG. 18 is a front perspective view of a bin prowl according to another embodiment.
Figure 19:
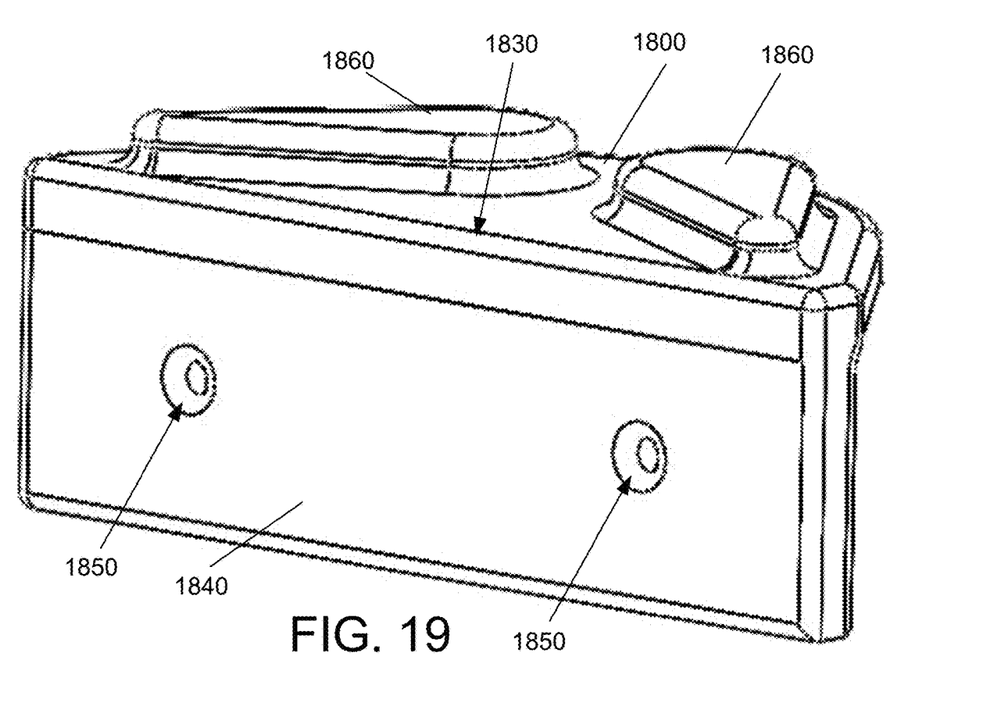
FIG. 19 is a rear perspective view of the bin prowl of FIG. 18.

FIG. 18 is a front perspective view of a bin prowl according to another embodiment. FIG. 19 is a rear perspective view of the bin prowl of FIG. 18. The bin prowl 1800 has a narrow distal end 1820 and a wide proximal end 1830 connected to a rear panel 1840. The rear panel 1840 includes a plurality of openings or apertures 1850 through which a fastener or the like can be used to connect or attach the rear panel 1840 to the front wall of the bin 110. In this embodiment, the bin prowl 1800 includes a plurality of upper protrusions or bumps 1860 to provide additional weight. The upper protrusions 1860 may each have a relatively narrower distal portion in the front and a relatively wider proximal portion in the rear to form a convex front to assist in breaking open the curtain strips or at least not to impede against breaking open the curtain strips.

Figure 20:
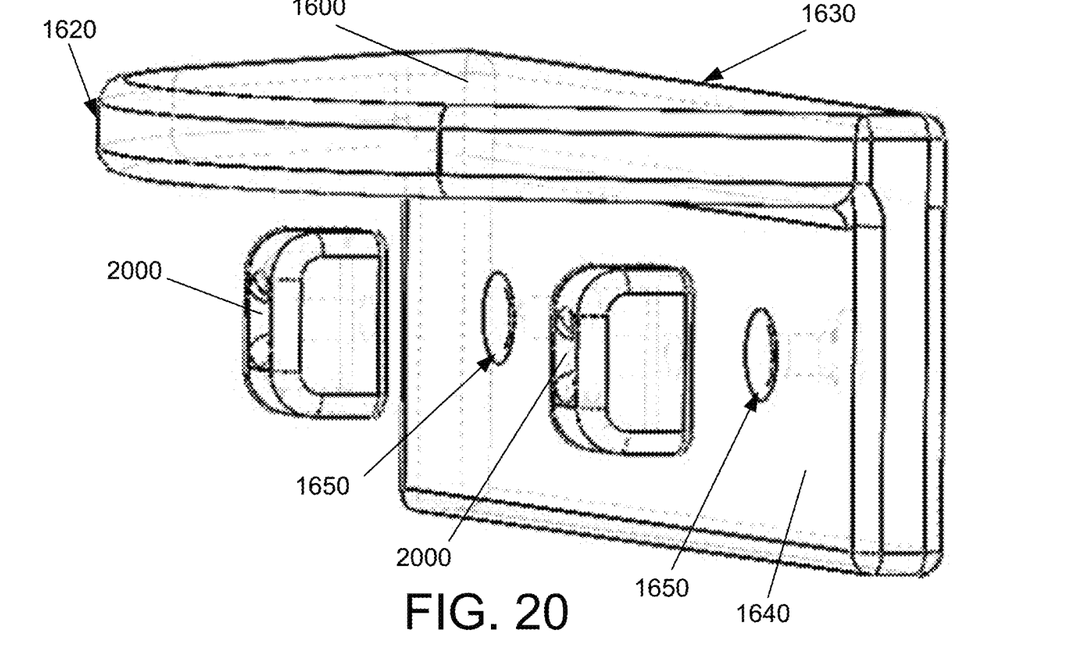
FIG. 20 is a perspective view illustrating an example of attachment members for attaching a bin prowl to the front wall of a bin.
Figure 21:
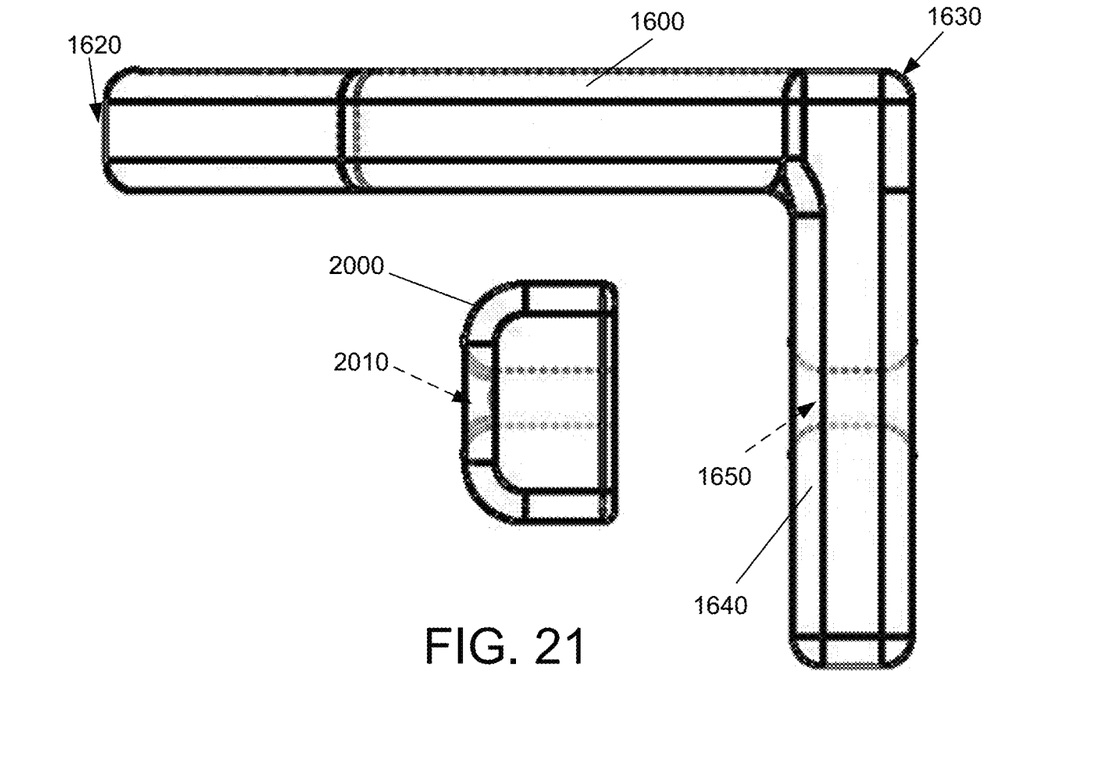
FIG. 21 is a side view of the attachment members for attaching the bin prowl of FIG. 20.

FIG. 20 is a perspective view illustrating an example of attachment members 2000 for attaching the bin prowl 1600 of FIG. 16 to the front wall of a bin 110. FIG. 21 is a side view of the attachment members 2000 for attaching the bin prowl 1600 of FIG. 20. In the embodiment shown, the attachment members 2000 have holes or apertures 2010 in alignment with the openings 1650 in the rear panel 1640 for fasteners (e.g., bolts, screws, etc.) or connectors to pass through to connect the rear panel 1640 to the front wall of the bin 110.

The bin prowl can be attached to the bin in various ways. Permanent ways may utilize double sided tape, a plastic pop rivet, or with plastic fasteners and an additional piece that can be provided. Removable ways may involve making the bin via additive manufacturing or a mold so as to provide a clip type feature in the front which engages the front rim at the upper edge of the bin.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation.

The indication of any elements or steps as "optional" does not indicate that all other or any other elements or steps are mandatory. The claims define the invention and form part of the specification. Limitations from the written description are not to be read into the claims.

What is claimed is:

1. A bin prowl apparatus comprising:
   a bin prowl including a distal end and a proximal end, the proximal end having a proximal width which is at least ten times larger than a distal width of the distal end, the proximal end configured to be connected with a front wall of a bin, the proximal width of the proximal end being at least 30% of a bin width of the front wall of the bin, the distal end extending forward from the proximal end along a direction of a length of the bin and being spaced from the proximal end by a minimum distance of 10% to over 100% of the proximal width of the proximal end, the bin prowl having a triangular shape between the proximal end and the distal end.

2. The bin prowl apparatus of claim 1, further comprising:
   a rear panel connected to the proximal end of the bin prowl and extending downward from the proximal end to be connected with the front wall of the bin.

3. The bin prowl apparatus of claim 2,
   wherein the rear panel includes a plurality of apertures to receive fasteners for fastening the rear panel to the front wall of the bin.

4. The bin prowl apparatus of claim 2,
   wherein the rear panel is disposed at an approximately right angle relative to the bin prowl.

5. The bin prowl apparatus of claim 2, further comprising:
   a top panel connected to the proximal end of the bin prowl and extending rearward from the proximal end of the bin prowl to be connected to upper edges of walls of the bin.

6. The bin prowl apparatus of claim 1, further comprising:
a top panel connected to the proximal end of the bin prowl and extending rearward from the proximal end of the bin prowl to be connected to upper edges of walls of the bin.

7. The bin prowl apparatus of claim 6,
wherein the top panel is configured as a top lid having side portions extending downward around a periphery of the bin to be connected to and cover the upper edges of the walls of the bin.

8. The bin prowl apparatus of claim 6,
wherein the top panel includes a plurality of openings.

9. The bin prowl apparatus of claim 6,
wherein the top panel and the bin prowl are configured as a planar member.

10. The bin prowl apparatus of claim 1,
wherein the bin prowl includes at least one upper protrusion to provide additional weight.

11. The bin prowl apparatus of claim 10,
wherein the at least one upper protrusion includes a proximal portion and a distal portion extending in a direction from the proximal end to the distal end of the bin prowl, the distal portion being narrower in width than the proximal portion.

12. The bin prowl apparatus of claim 1,
wherein the distal end is a pointed tip of a triangle.

13. The bin prowl apparatus of claim 1,
wherein the distal end is a rounded tip of a triangle.

14. A bin prowl apparatus comprising:
a bin prowl having a planar structure with a distal end and a proximal end, the bin prowl having a maximum width as a proximal width at the proximal end and a minimum width as a distal width at the distal end, the proximal width being at least ten times larger than the distal width, the proximal end configured to be connected with a front wall of a bin, the distal end extending forward from the proximal end along a direction of a length of the bin and being spaced from the proximal end by a minimum distance of 10% of a bin width of the front wall of the bin, the bin prowl having a triangular shape between the proximal end and the distal end.

15. The bin prowl apparatus of claim 14, further comprising:
a rear panel extending downward from the proximal end of the bin prowl at an approximately right angle to be connected with the front wall of the bin.

16. The bin prowl apparatus of claim 15,
wherein the rear panel includes a plurality of apertures to receive fasteners for fastening the rear panel to the front wall of the bin.

17. The bin prowl apparatus of claim 14, further comprising:
a top panel extending rearward from the proximal end of the bin prowl to be coplanar with the bin prowl and to be connected to upper edges of walls of the bin.

18. The bin prowl apparatus of claim 17,
wherein the top panel is configured as a top lid having side portions extending downward around a periphery of the bin to be connected to and cover the upper edges of the walls of the bin.

19. The bin prowl apparatus of claim 17,
wherein the top panel includes a plurality of openings.

20. A method of forming a bin with prowl, the method comprising:
connecting a proximal end of a bin prowl to a front wall of a bin, the bin prowl having a distal end extending forward from the proximal end along a direction of a length of the bin, the proximal end having a proximal width which is at least ten times larger than a distal width of the distal end, the proximal width of the proximal end being at least 30% of a bin width of the front wall of the bin, the distal end being spaced from the proximal end by a minimum distance of 10% to over 100% of the proximal width of the proximal end, the bin prowl having a triangular shape between the proximal end and the distal end.

21. The method of claim 20, further comprising:
forming a rear panel to extend downward from the proximal end of the bin prowl; and
detachably connecting the rear panel with the front wall of the bin.

22. The method of claim 21, further comprising:
detachably fastening the rear panel, using fasteners through a plurality of apertures of the rear panel, to the front wall of the bin.

23. The method of claim 20, further comprising:
forming a top panel to extend rearward from the proximal end of the bin prowl; and
connecting the top panel to upper edges of walls of the bin.

24. The method of claim 23, further comprising:
configuring the top panel as a top lid having side portions extending downward around a periphery of the bin to be connected to and cover the upper edges of the walls of the bin.

25. The method of claim 23, further comprising:
forming the top panel having a plurality of openings.

26. The method of claim 23, further comprising:
forming the top panel and the bin prowl as a planar member.

* * * * *